United States Patent [19]

Uhde

[11] Patent Number: 5,279,026
[45] Date of Patent: Jan. 18, 1994

[54] PROCESS FOR PRODUCING A THIN-FILM MAGNETIC TAPE HEAD

[75] Inventor: Dietmar Uhde, Königsfeld, Fed. Rep. of Germany

[73] Assignee: Deutsche Thomson Brandt GmbH, Villingen-Schwenningen, Fed. Rep. of Germany

[21] Appl. No.: 986,186

[22] Filed: Dec. 7, 1992

[30] Foreign Application Priority Data

Apr. 23, 1990 [DE] Fed. Rep. of Germany ....... 4012823
Apr. 15, 1991 [WO] PCT Int'l Appl. ................. PCT/EP91/00713

[51] Int. Cl.⁵ .................................. G11B 5/42
[52] U.S. Cl. ....................... 29/603; 360/119; 360/125
[58] Field of Search ............... 360/119–121, 360/125–127; 29/603

[56] References Cited

U.S. PATENT DOCUMENTS

| 4,399,479 | 8/1983 | Meckel | 360/126 |
| 4,601,099 | 7/1986 | Nishiyama | 29/603 |
| 5,090,111 | 2/1992 | Lazzari | 29/603 |
| 5,123,156 | 6/1992 | Meunier et al. | 29/603 |

FOREIGN PATENT DOCUMENTS

| 0233086 | 8/1987 | European Pat. Off. ....... G11B 5/31 |
| 4020206 | 1/1991 | Fed. Rep. of Germany .......... G11B 5/31 |

OTHER PUBLICATIONS

Patent Abstracts Of Japan vol. 5 No. 196 56-117320 Dec. 12, 1981.
Patent Abstracts Of Japan vol. 11 No. 112 61-260411 Apr. 9, 1987.
Patent Abstracts Of Japan vol. 11 No. 305 62-97118 Oct. 6, 1987.

*Primary Examiner*—Carl E. Hall
*Attorney, Agent, or Firm*—J. S. Tripoli; E. P. Herrmann; L. L. Hallacher

[57] ABSTRACT

A process for producing a thin-film magnetic tape head includes the steps of coating a substrate with a layer of material which protects the substrate from an etchant. A cavity is etched into the substrate and a prismoid of magnet material is deposited in the cavity. The sides of the substrate are removed so that the prismoid projects above the sides for a substantial portion of the height of the prismoid. The substrate is coated with a gap-coating layer and the gap-coating is removed from one side of the prismoid. Another layer of magnetic material is deposited onto the substrate and various parts, such as pole shoes, are formed. The substrate is polished and the apex of the prismoid is removed. Head windings are made. A return path for the head windings is provided by depositing another layer of magnetic material onto the substrate. A protective layer of a metal oxide is deposited onto the substrate.

3 Claims, 3 Drawing Sheets

PROCESS FOR PRODUCING A THIN-FILM MAGNETIC TAPE HEAD

This application is based on PCT application PCT/EP 91/00713, filed Apr. 15, 1991 by Dietmar Uhde and titled "Process For Producing A Thin-Film Magnetic Tape Head".

There is no promising approach known for manufacturing a true thin-film magnetic tape head with azimuth. Known metal-in-gap (e.g. Sony TSS, etc.) or lamellar sendustamorphous heads are manufactured in clocks (non-planar) and the formation of the air gap is achieved by putting together two half-blocks. Thin-film blocks, such as the IMB Spiral Hard Disk head, are not suitable for systems with tape-head contact, as is required in magnetic tape devices, because of small gap height. A gap inclination (azimuth) can only be generated by mechanically machining the backing material (substrate). Also, such a type of magnetic tape head cannot be considered for analog systems (long tape wavelengths and secondary gap effects). Systems with azimuth are necessary for track-on-track writing without lawns (separating area between the recording tracks). It therefore is an object of this invention to manufacture a magnetic tape head in thin-film technology without combining two half-blocks.

The inventive process for manufacturing heads described herein combines the advantages of planar thin-film technology and gap production with the magnetic and mechanical advantages of heads manufactured conventionally. A preferred embodiment is explained by means of drawings in which.

Figure 1:
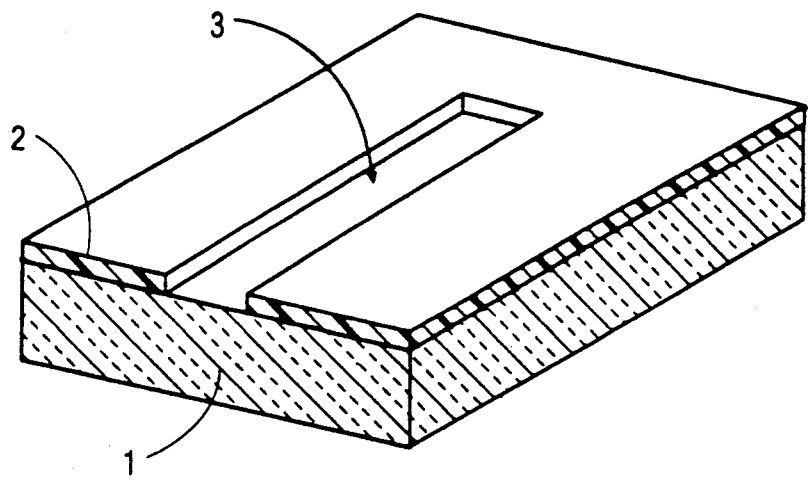
FIG. 1 shows a section from a wafer after the first and second procedure steps.
Figure 2:
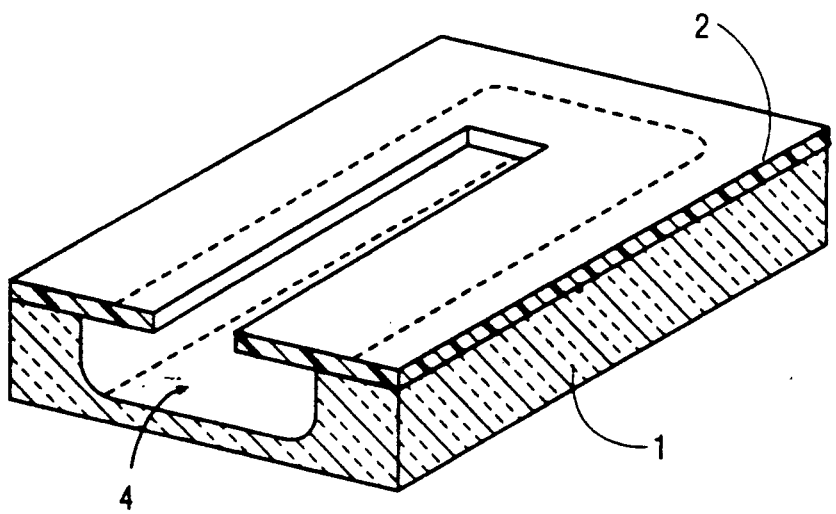
FIG. 2 shows the wafer section following the third procedure step.

As shown in FIG. 1, in the first step for manufacturing a thin-film magnetic tape head, a substrate 1 (wafer) is provided with a coating 2 which is resistant to a caustic medium to which the substrate 1 is sensitive. The coating 2 is deposited by means of vapor-deposition, sputtering or by an oxidation process. In the second step, a window 3 is etched into the coating 2 by means of a photograph or photolithographic technique. As shown in FIG. 2, in the third step a cavity 4 is etched into the substrate 1 through the window 3.

Figure 3:
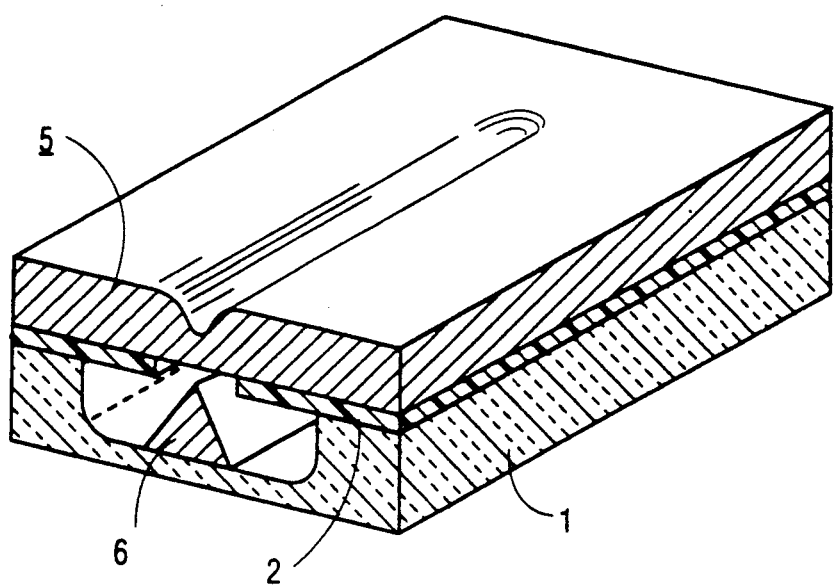
FIG. 3 shows the wafer section following the fourth procedure step.
Figure 4:
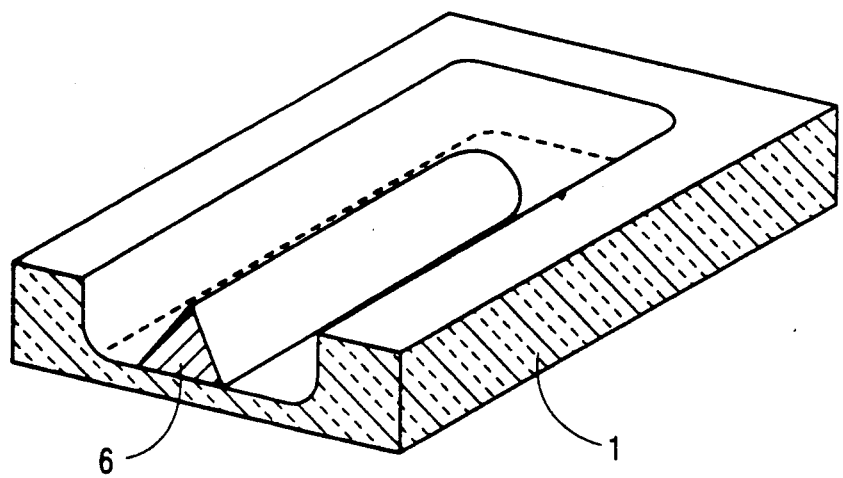
FIG. 4 shows the wafer section following the fifth procedure step.

In the fourth step, shown in FIG. 3, a soft magnetic material 5, for example Sendust, is deposited onto the substrate. This is preferably carried out through sputtering of the window, to form an upwardly projecting prismoid 6 in the cavity 4. The coating 2 and the soft magnetic material 5 are removed, for example by stripping, in the fifth step, shown in FIG. 4.

Figure 5:
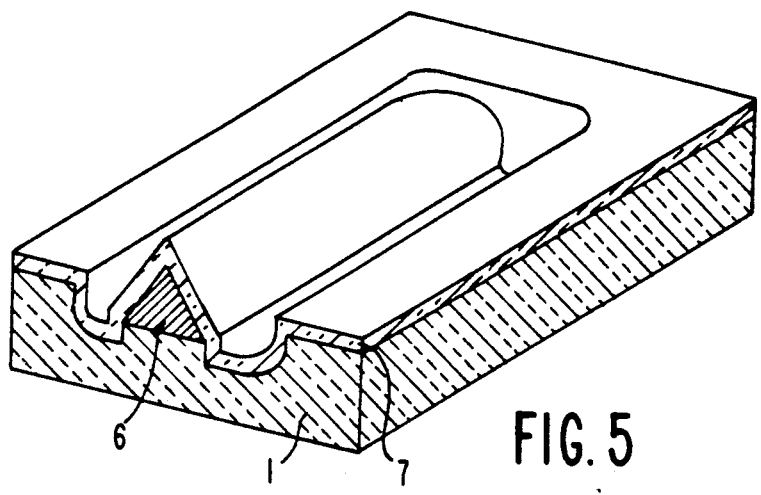
FIG. 5 shows the wafer section following the sixth and seventh procedure steps.

The results of the sixth and seventh steps are shown in FIG. 5. In the sixth step the substrate 1 is etched away from both sides of the prismoid 6 until a substantial portion of the height of the prismoid projects above the sides of the substrate surface. In the seventh step the substrate 1 is provided with a coating which serves as a gap layer 7. This is carried out by means of sputtering or vapor-deposition. The gap layer (gap spacer) later forms the non-magnetic air gap.

Figure 6:
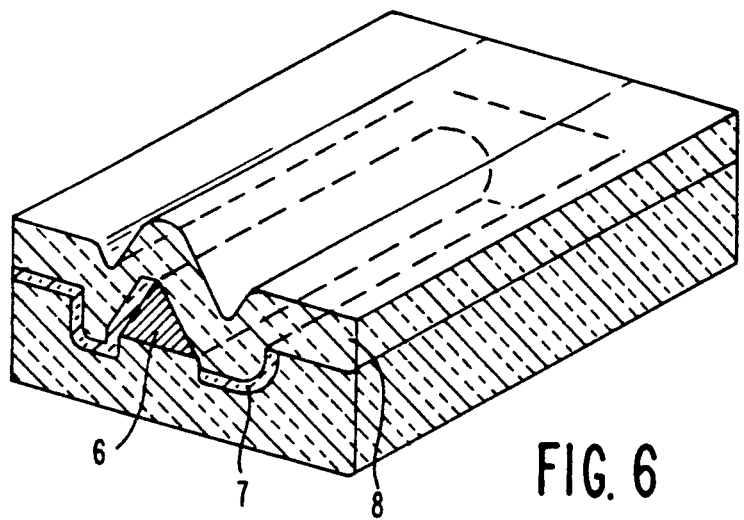
FIG. 6 shows the wafer section following the eighth and ninth procedure steps.

FIG. 6 shows the results of the eighth and ninth steps. In step 7 asymmetric etching, for example by inclining the wafer or the etching device, is used to etch the gap coating on one-side, i.e. sputtered parts are not etched. The gap coating then remains on only one side of the prismoid. Another layer 8 is deposited on to the substrate 1. This layer also consists of a soft magnetic material such as Sendust, for example.

Figure 7:
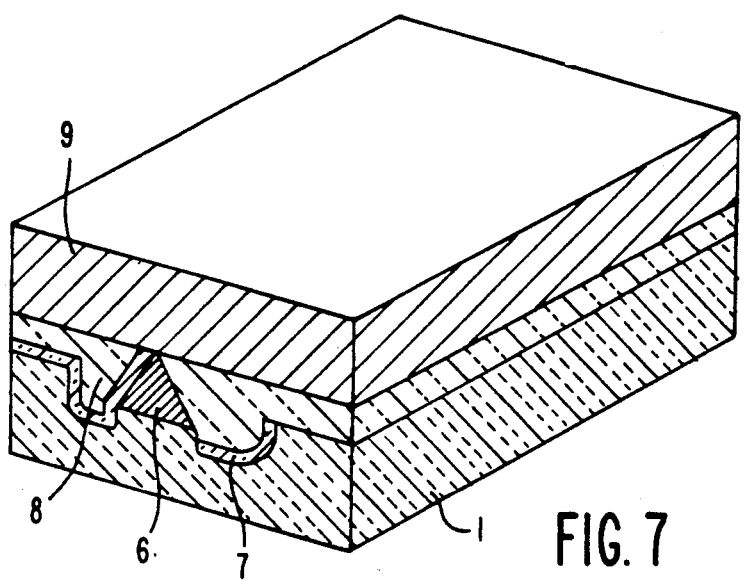
FIG. 7 shows the wafer section following the tenth through fourteenth procedure steps.

The results of the remaining five steps are shown in FIG. 7. The various parts of the magnetic tape head, for example, pole shoes, winding space, etc., are shaped via a template by etching in the layer 8. The substrate 1 is polished, to remove the prismoid apex. The head windings are manufactured in thin-film technology (not illustrated in the Figures) which form the head legs of the thin-film magnetic tape head. The return path of the head windings is closed by an additional soft magnetic layer. The substrate is coated with a further thick layer 9, for example, a metal oxide such as $AL_2O_3$, and thereby protected. Finally, the wafer is divided, ground and polished, and can then be passed on for further processing.

The process described above has the particular advantage that there are no limitations regarding the material and the track width of the tape for the magnetic tape head. Also, lamination is possible, whereby eddy current losses can be prevented. In addition, only one polishing procedure is required. Further, by using the process, pure silicon scanners can be manufactured because always two magnetic tape heads are so arranged on the head drum that they are located opposite a certain azimuth in pairs.

I claim:

1. A process for producing a thin-film magnetic tape head comprising the steps of:
   a) coating a substrate with a layer of material which is resistant to an etchant to said substrate;
   b) providing a window in said layer;
   c) etching a cavity into said substrate through said window;
   d) depositing a magnetic material onto said substrate to form an upwardly projecting prismoid in said cavity;
   e) removing said layer and said magnetic material;
   f) removing the sides of said substrate until said prismoid projects above said sides;
   g) coating said substrate with a gap-coating layer;
   h) removing said gap-coating layer from one side of said prismoid;
   i) depositing a layer of magnetic material onto said substrate;
   j) forming various magnetic parts in said layer of magnetic material;
   k) polishing said substrate and removing the apex from said prismoid;
   l) manufacturing head windings and forming the head legs of said magnetic head;
   m) providing a return path for the head windings by depositing another magnetic layer on said substrate; and
   n) providing a protective layer by depositing a metal oxide layer on said substrate.

2. The method of claim 1 wherein said sides are removed for a substantial portion of the height of said prismoid.

3. The method of claim 2 wherein said head windings are made using thin film technology.

* * * * *